(12) United States Patent
Raju et al.

(10) Patent No.: US 12,367,277 B2
(45) Date of Patent: Jul. 22, 2025

(54) SYSTEMS AND METHODS FOR AUTOMATED CHANGE REVIEW FOR ENHANCED NETWORK AND DATA SECURITY

(71) Applicant: BANK OF AMERICA CORPORATION, Charlotte, NC (US)

(72) Inventors: Samanthapudi Subba Raju, Telangana (IN); Praveen Rayapudi, Telangana (IN); Ajay Suryadevara, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 295 days.

(21) Appl. No.: 17/515,826

(22) Filed: Nov. 1, 2021

(65) Prior Publication Data
US 2023/0137566 A1    May 4, 2023

(51) Int. Cl.
*G06F 21/55*    (2013.01)

(52) U.S. Cl.
CPC ...... *G06F 21/554* (2013.01); *G06F 2221/033* (2013.01)

(58) Field of Classification Search
CPC .. G06F 21/554; G06F 2221/033; G06F 11/00; G06F 8/00; G06F 18/00; G06F 21/00; G06F 8/70; G06F 11/323; G06F 11/3604
See application file for complete search history.

(56) References Cited

U.S. PATENT DOCUMENTS

| | | | |
|---|---|---|---|
| 6,269,474 B1 | 7/2001 | Price | |
| 7,650,339 B2 | 1/2010 | Cho et al. | |
| 8,200,775 B2 | 6/2012 | Moore | |
| 8,307,351 B2 | 11/2012 | Weigert | |
| 8,856,725 B1 | 10/2014 | Anderson et al. | |
| 9,021,458 B1 | 4/2015 | Jacob et al. | |
| 9,182,979 B2 | 11/2015 | Odenheimer et al. | |
| 9,542,176 B2 | 1/2017 | Bird et al. | |
| 9,600,275 B2 | 3/2017 | Fan et al. | |

(Continued)

OTHER PUBLICATIONS

Rebai, S., Amich, A., Molaei, S. et al. Multi-objective code reviewer recommendations: balancing expertise, availability and collaborations. Autom Softw Eng 27, No. 3-4, 301-328. Sep. 5, 2020. pp. 1, 2, and 6 (Year: 2020).*

*Primary Examiner* — Theodore C Parsons
*Assistant Examiner* — James P Moles
(74) *Attorney, Agent, or Firm* — Moore & Van Allen PLLC; Nicholas C. Russell (57) ABSTRACT

Systems, methods, and computer program products are provided for providing coding change review. The method includes receiving a code change indicator. The code change indicator is associated with a changed code that has been changed by at least one user. The method also includes determining a coding language of the changed code based on at least one of a keyword library or a code pattern. The method further includes determining a change review indication based on the determined coding language. The change review indicator indicates whether one or more errors exist in the changed code. The method still further includes determining one or more change review actions to carry out based on the change review indication.

14 Claims, 6 Drawing Sheets

(56) References Cited

U.S. PATENT DOCUMENTS

| | | | |
|---|---|---|---|
| 9,632,771 B2 | 4/2017 | Toub | |
| 9,886,269 B2 * | 2/2018 | Grillo et al. | |
| 9,898,280 B2 * | 2/2018 | Balachandran | G06F 8/43 |
| 9,916,224 B2 * | 3/2018 | Macleod | G06F 11/3688 |
| 9,952,961 B2 | 4/2018 | Atyam et al. | |
| 10,761,810 B2 | 9/2020 | Ramakrishna et al. | |
| 10,776,498 B2 | 9/2020 | Wasiq et al. | |
| 10,901,727 B2 | 1/2021 | Biddle et al. | |
| 10,915,316 B1 | 2/2021 | Turner et al. | |
| 11,024,424 B2 | 6/2021 | Sun et al. | |
| 11,392,844 B1 * | 7/2022 | Rao | G06N 20/00 |
| 2007/0168946 A1 * | 7/2007 | Drissi | G06F 8/36 |
| | | | 717/110 |
| 2016/0179505 A1 * | 6/2016 | Grillo | G06F 16/148 |
| | | | 717/101 |
| 2018/0285103 A1 * | 10/2018 | Jha | G06F 8/71 |
| 2018/0349789 A1 * | 12/2018 | Chen | G06F 9/4881 |
| 2019/0228319 A1 | 7/2019 | Gupta et al. | |
| 2019/0303140 A1 * | 10/2019 | Kelly | G06N 3/08 |
| 2020/0379879 A1 * | 12/2020 | Plotnik | G06F 21/577 |
| 2020/0394588 A1 * | 12/2020 | Sanchez | G06F 8/75 |
| 2021/0019249 A1 * | 1/2021 | Gnaneswaran | G06N 20/20 |
| 2021/0089992 A1 * | 3/2021 | Xu | G06N 3/08 |
| 2021/0124561 A1 * | 4/2021 | Pezaris | G06F 8/73 |
| 2021/0124830 A1 * | 4/2021 | Dinh | G06F 21/577 |
| 2021/0149666 A1 * | 5/2021 | Goern | G06F 8/71 |
| 2021/0311729 A1 * | 10/2021 | Gupta | G06N 3/045 |
| 2021/0334367 A1 * | 10/2021 | Chibon | G06F 11/3604 |
| 2022/0043646 A1 * | 2/2022 | James | G06F 8/30 |
| 2022/0164183 A1 * | 5/2022 | Talmor | G06F 8/33 |
| 2022/0198269 A1 * | 6/2022 | Canedo | G06F 8/36 |
| 2022/0245055 A1 * | 8/2022 | Chen | G06F 8/75 |
| 2023/0418725 A1 * | 12/2023 | Freeling | G06F 8/20 |

* cited by examiner

Table 600 — Reviewers:

| Reviewer Name | Area of Expertise | Comfort Level | Availability |
|---|---|---|---|
| Reviewer 1 | A | High | X |
| Reviewer 2 | B | Med | |
| Reviewer 3 | C | Low | X |
| Reviewer 4 | C | High | X |
| | D | Med | X |
| Reviewer 5 | E | High | X |

Table 610 — Objects:

| Object Name | Object Classification | Complexity |
|---|---|---|
| 1 | C | High |
| 2 | B | Medium |
| 3 | C | Low |
| 4 | E | High |
| 5 | E | High |

SYSTEMS AND METHODS FOR AUTOMATED CHANGE REVIEW FOR ENHANCED NETWORK AND DATA SECURITY

TECHNOLOGICAL FIELD

An example embodiment relates generally to automated code change review, and more particularly, to providing for automated change review for coding across a plurality of coding languages.

BACKGROUND

Conventional change review processes lack controls to prevent malicious actors from modifying code. Change review can often be ineffective and time consuming due to reviewers being ill-equipped for a given change review due to availability, ability, or the like. As such, there exists a need for a system that allows for a more automated change review process.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

In an example embodiment, a system for providing coding change review is provided. The system includes at least one non-transitory storage device and at least one processing device coupled to the at least one non-transitory storage device. The at least one processing device is configured to receive a code change indicator. The code change indicator is associated with a changed code that has been changed by at least one user. The at least one processing device is also configured to determine a coding language of the changed code based on at least one of a keyword library or a code pattern. The at least one processing device is further configured to determine a change review indication based on the determined coding language. The change review indicator indicates whether one or more errors exist in the changed code. The at least one processing device is still further configured to determine one or more change review actions to carry out based on the change review indication.

In some embodiments, the keyword library includes a plurality of language keyword indicators, with each language keyword indicator including one or more keyword terms associated with a different coding language. In some embodiments, the at least one processing device is also configured to determine one or more remedial measures in an instance in which the change review indication indicates one or more errors exist in the changed code. In some embodiments, the at least one processing device is also configured to cause a transmission of the one or more remedial measures to at least one reviewer for review.

In some embodiments, the one or more change review actions include selecting a reviewer to analyze the code in response to the change review indication. In some embodiments, the reviewer is selected based on an availability of the reviewer, a complexity of the changed code, and a reviewer rating. In some embodiments, in an instance in which the change review indication indicates that no errors exist in the changed code, the one or more change review actions include approving the changed code for implementation. In such an embodiment, in an instance in which the change review indication indicates that one or more errors exist in the changed code, the one or more change review actions include determining a reviewer to analyze the changed code.

In another example embodiment, a computer program product for providing coding change review is provided. The computer program product includes at least one non-transitory computer-readable medium having computer-readable program code portions embodied therein. The computer-readable program code portions including an executable portion configured to receive a code change indicator. The code change indicator is associated with a changed code that has been changed by at least one user. The computer-readable program code portions also including an executable portion configured to determine a coding language of the changed code based on at least one of a keyword library or a code pattern. The computer-readable program code portions further including an executable portion configured to determine a change review indication based on the determined coding language. The change review indicator indicates whether one or more errors exist in the changed code. The computer-readable program code portions still further including an executable portion configured to determine one or more change review actions to carry out based on the change review indication.

In some embodiments, the keyword library includes a plurality of language keyword indicators, with each language keyword indicator including one or more keyword terms associated with a different coding language. In some embodiments, the computer-readable program code portions also include an executable portion configured to determine one or more remedial measures in an instance in which the change review indication indicates one or more errors exist in the changed code.

In some embodiments, the computer-readable program code portions further include an executable portion configured to cause a transmission of the one or more remedial measures to at least one reviewer for review. In some embodiments, the one or more change review actions include selecting a reviewer to analyze the code in response to the change review indication. In some embodiments, the reviewer is selected based on an availability of the reviewer, a complexity of the changed code, and a reviewer rating.

In some embodiments, in an instance in which the change review indication indicates that no errors exist in the changed code, the one or more change review actions include approving the changed code for implementation. In such an embodiment, in an instance in which the change review indication indicates that one or more errors exist in the changed code, the one or more change review actions include determining a reviewer to analyze the changed code.

In still another example embodiment, a computer-implemented method for providing coding change review is provided. The method includes receiving a code change indicator. The code change indicator is associated with a changed code that has been changed by at least one user. The method also includes determining a coding language of the changed code based on at least one of a keyword library or a code pattern. The method further includes determining a change review indication based on the determined coding language. The change review indicator indicates whether one or more errors exist in the changed code. The method still further includes determining one or more change review actions to carry out based on the change review indication.

In some embodiments, the keyword library includes a plurality of language keyword indicators, with each language keyword indicator including one or more keyword terms associated with a different coding language. In some embodiments, the method also includes determining one or more remedial measures in an instance in which the change review indication indicates one or more errors exist in the changed code. In some embodiments, the method also includes causing a transmission of the one or more remedial measures to at least one reviewer for review.

In some embodiments, the one or more change review actions include selecting a reviewer to analyze the code in response to the change review indication. In such an embodiment, the reviewer is selected based on an availability of the reviewer, a complexity of the changed code, and a reviewer rating.

In some embodiments, in an instance in which the change review indication indicates that no errors exist in the changed code, the one or more change review actions include approving the changed code for implementation. In such an embodiment, in an instance in which the change review indication indicates that one or more errors exist in the changed code, the one or more change review actions include determining a reviewer to analyze the changed code.

Embodiments of the present disclosure address the above needs and/or achieve other advantages by providing apparatuses (e.g., a system, computer program product and/or other devices) and methods for automated change review for enhanced network and data security. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more entity resources, including, but not limited to, one or more entity systems, one or more entity databases, one or more applications, one or more servers, or the like to perform one or more organization activities associated with the entity. In some embodiments, an entity may be any organization that develops, maintains, utilizes, and/or controls one or more applications and/or databases. Applications as described herein may be any software applications configured to perform one or more operations of the entity. Databases as described herein may be any datastores that store data associated with organizational activities associated with the entity. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Change review is an important part of quality assurance of coding systems, as the coding must be reviewed for potential defects. The change review process can impact quality and performance of changes implement in production environment. However, current change review tools lack certain features, which results in some defects, whether intentional or otherwise, to be missed, resulting in said defected code being adopted across one or more systems. Various embodiments of the present disclosure provide an automated change review tool that employs an end to end automated solution to support the change review process.

The automated change review tool can be built with a language keyword library and code pattern repository to support many different coding languages. The automated change review tool also has an AI assistant to provide logical and automated solutions for proposed change review items. The change review tool evaluates each object relating to the changed code to provide automated recommendations to reviewers to assist in decision making. Additionally, some embodiments of the disclosure include fully integrated automation, that eliminates the need for any manual intervention. Therefore, various embodiments allowed for a single point stop for quality checks, code pattern analysis, and performance checks for a proposed change.

The automated change review tool may provide code pattern analysis which helps to optimize the code and improve performance of application run times by providing code pattern recommendations. Recommendations for any code modifications may also be provided.

Figure 1:
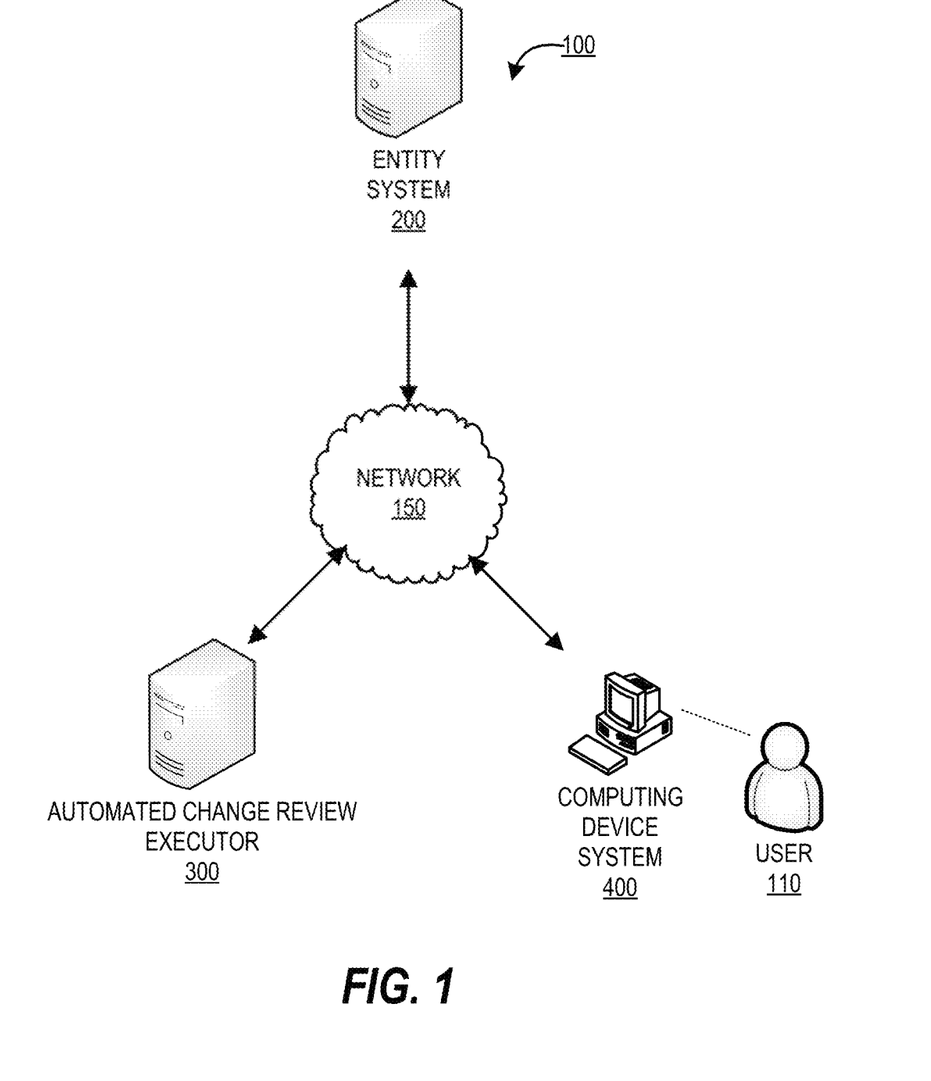
FIG. 1 provides a block diagram illustrating a system environment for automated change review for enhanced network and data security, in accordance with an embodiment of the present disclosure.

FIG. 1 provides a block diagram illustrating a system environment 100 for automated change review for enhanced network and data security, in accordance with an embodiment of the invention. As illustrated in FIG. 1, the environment 100 includes an automated change review executor 300, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees (e.g., application developers, database administrators, application owners, application end users, business analysts, finance agents, or the like) of an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more entity resources to perform one or more organizational activities.

The automated change review executor 300 is a system of the present invention for performing one or more process steps described herein. In some embodiments, the automated change review executor 300 may be an independent system. In some embodiments, the automated change review executor 300 may be a part of the entity system 200.

The automated change review executor 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the automated change review executor 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the automated change review executor 300, and/or entity system 200 across the network 150.

Figure 2:
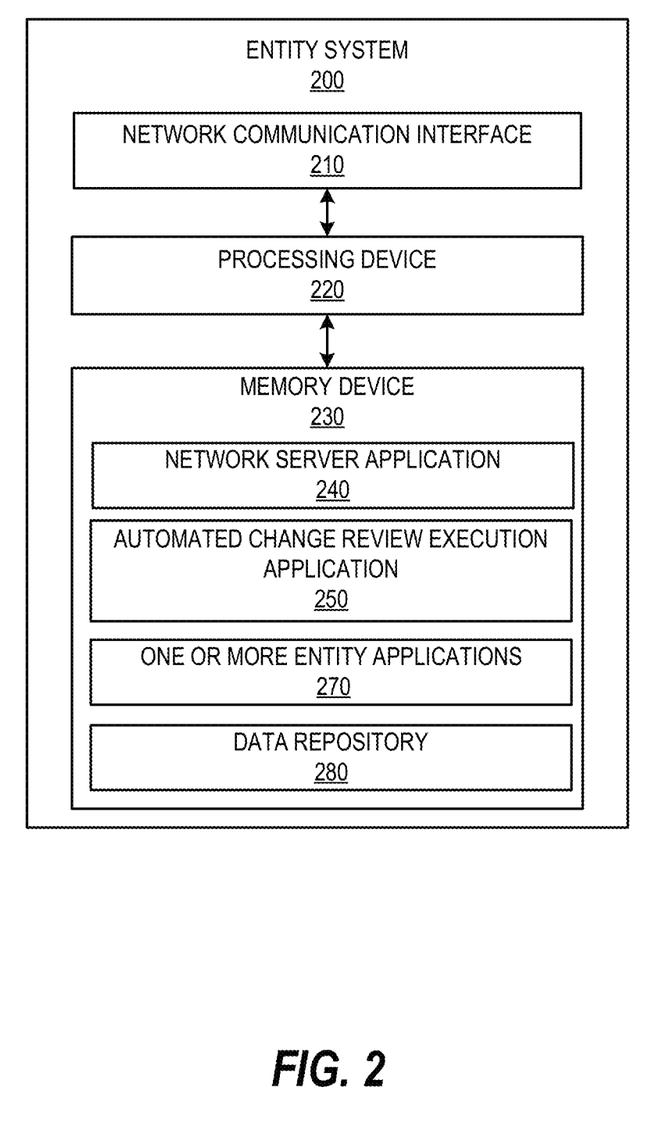
FIG. 2 provides a block diagram illustrating the entity system 200 of FIG. 1, in accordance with an embodiment of the present disclosure.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution. In some embodiments, the entity system 200 may be a multi-tenant cluster storage system.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an automated change review execution application 250, one or more entity applications 270, and a data repository 280 comprising data accessed, retrieved, and/or computed by the entity system 200. The one or more entity applications 270 may be any applications developed, supported, maintained, utilized, and/or controlled by the entity. The computer-executable program code of the network server application 240, the automated change review execution application 250, the one or more entity application 270 to perform certain logic, data-extraction, and data-storing functions of the entity system 200 described herein, as well as communication functions of the entity system 200.

The network server application 240, the automated change review execution application 250, and the one or more entity applications 270 are configured to store data in the data repository 280 or to use the data stored in the data repository 280 when communicating through the network communication interface 210 with the automated change review executor 300, and/or the computing device system 400 to perform one or more process steps described herein. In some embodiments, the entity system 200 may receive instructions from the automated change review executor 300 via the automated change review execution application 250 to perform certain operations. The automated change review execution application 250 may be provided by the automated change review executor 300. The one or more entity applications 270 may be any of the applications used, created, modified, facilitated, and/or managed by the entity system 200.

Figure 3:
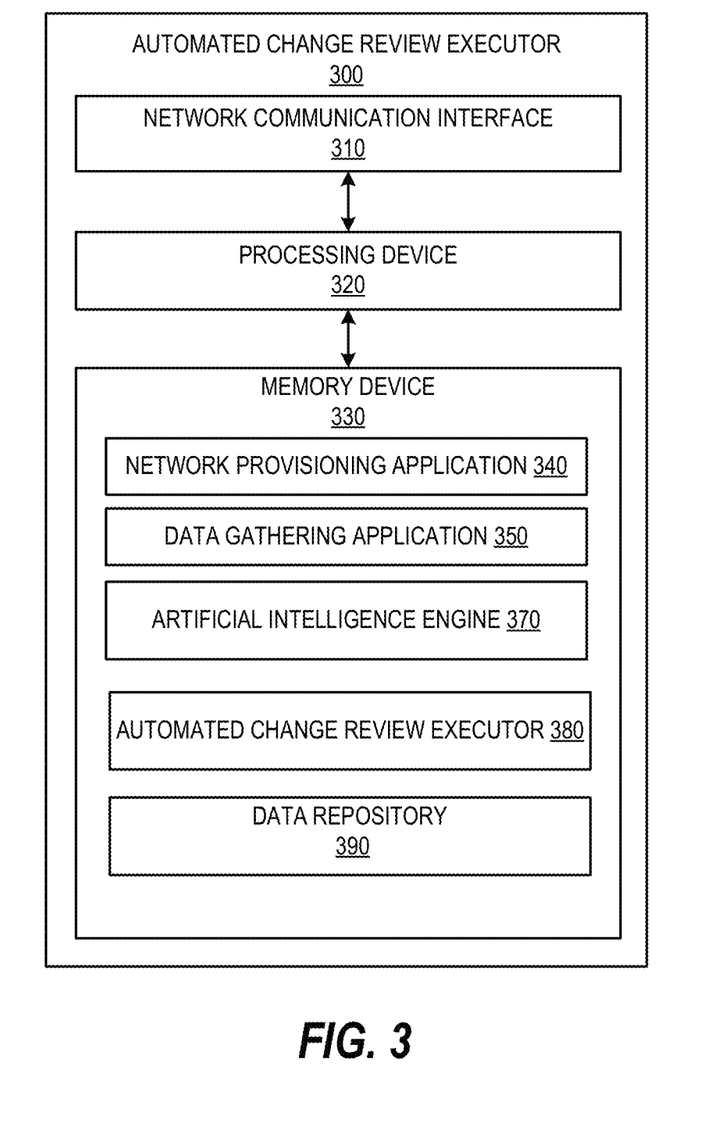
FIG. 3 provides a block diagram illustrating an automated change review executor 300 of FIG. 1, in accordance with an embodiment of the present disclosure.

FIG. 3 provides a block diagram illustrating the automated change review executor 300 in greater detail, in accordance with embodiments of the invention. As illustrated in FIG. 3, in one embodiment of the invention, the automated change review executor 300 includes one or more processing devices 320 operatively coupled to a network communication interface 310 and a memory device 330. In certain embodiments, the automated change review executor 300 is operated by an entity, such as a financial institution. In some embodiments, the automated change review executor 300 is owned or operated by the entity of the entity system 200. In some embodiments, the automated change review executor 300 may be an independent system. In alternate embodiments, the automated change review executor 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the automated change review executor 300 described herein. For example, in one embodiment of the automated change review executor 300, the memory device 330 includes, but is not limited to, a network provisioning application 340, a data gathering application 350, an artificial intelligence engine 370, an automated change review executor 380, and a data repository 390 comprising any data processed or accessed by one or more applications in the memory device 330. The computer-executable program code of the network provisioning application 340, the data gathering application 350, the artificial intelligence engine 370, and the automated change review executor 380 may instruct the processing device 320 to perform certain logic, data-processing, and data-storing functions of the automated change review executor 300 described herein, as well as communication functions of the automated change review executor 300.

The network provisioning application 340, the data gathering application 350, the artificial intelligence engine 370, and the automated change review executor 380 are configured to invoke or use the data in the data repository 390 when communicating through the network communication interface 310 with the entity system 200, and/or the computing device system 400. In some embodiments, the network provisioning application 340, the data gathering application 350, the artificial intelligence engine 370, and the automated change review executor 380 may store the data extracted or received from the entity system 200, and the computing device system 400 in the data repository 390. In some embodiments, the network provisioning application 340, the data gathering application 350, the artificial intelligence engine 370, and the automated change review executor 380 may be a part of a single application.

Figure 4:
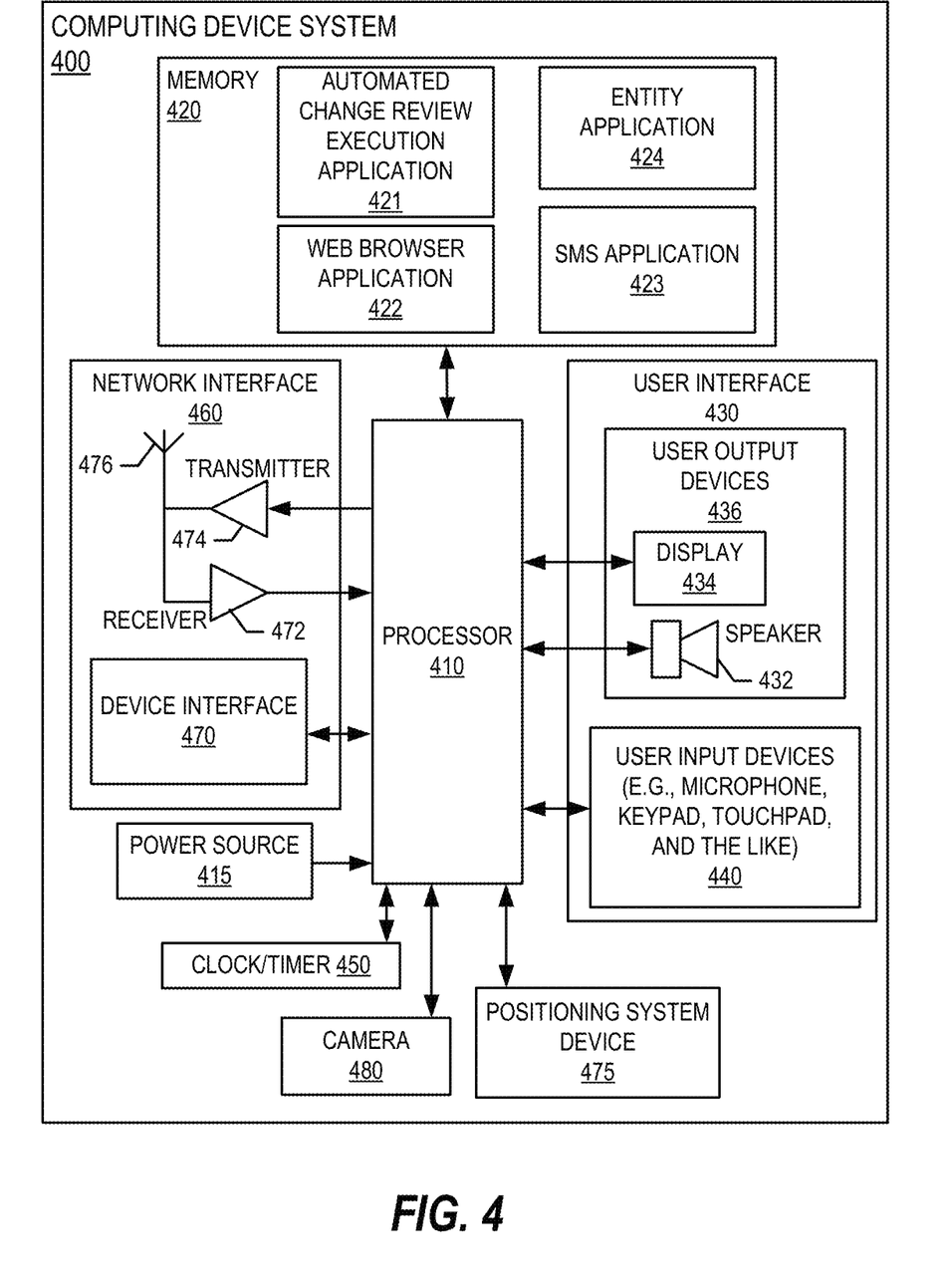
FIG. 4 provides a block diagram illustrating the computing device system 400 of FIG. 1, in accordance with an embodiment of the present disclosure.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, electronic media devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an automated change review execution application 421, entity application 424. These applications also typically instructions to a graphical user interface (GUI) on the display 430 that allows the user 110 to interact with the entity system 200, the automated change review executor 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the automated change review execution application 421 provided by the automated change review executor 300 allows the user 110 to access the automated change review executor 300. In some embodiments, the entity application 424 provided by the entity system 200 and the automated change review execution application 421 allow the user 110 to access the functionalities provided by the automated change review executor 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
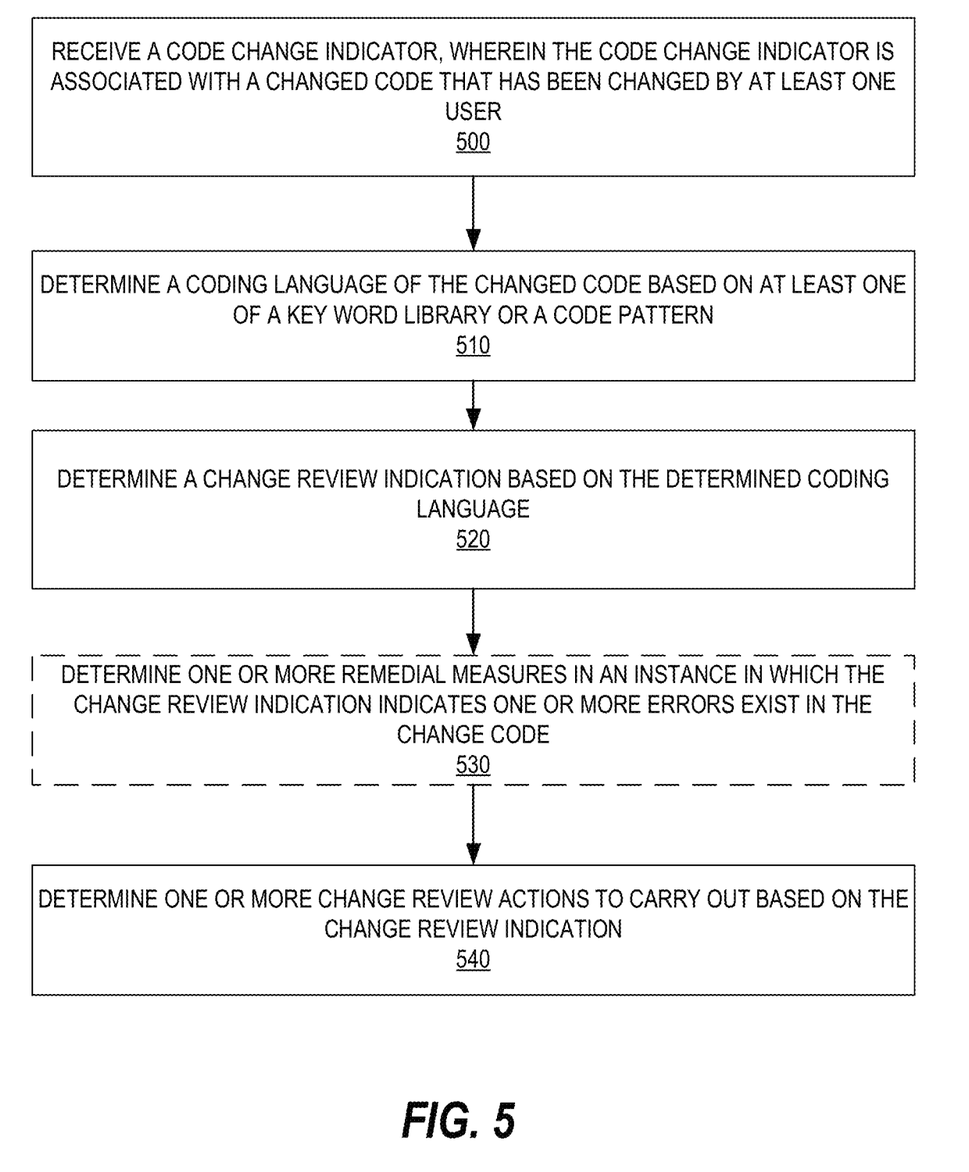
FIG. 5 provides a flowchart illustrating a method of providing coding change review in accordance with embodiments of the present disclosure.

Referring now to FIG. 5, a method of providing a coding change review is provided. The method may be carried out by a system discussed herein (e.g., the entity system 200, the automated change review executor 300, and/or the computing device system 400). An example system may include at least one non-transitory storage device and at least one processing device coupled to the at least one non-transitory storage device. In such an embodiment, the at least one processing device is configured to carry out the method discussed herein. The operations of FIG. 5 may be used for performance checks and quality checks for coding. The operations discussed can be applied to many different coding languages and can be considered language universal.

In various embodiments, the operations discussed in reference to FIG. 5 are carried out by the automated change review executor 300. In such an instance, the automated change review executor 300 is provisioned to integrate with one more entity application. Upon the initiation of a code change, a code change indicator (discussed in reference to Block 500 of FIG. 5) relating to the change are automatically pushed to the automated change review executor 300. The automated change review executor 300 may sort the change records based on impact, priority, and/or release date. The automated change review executor 300 analyzes objects relating to the change via machine learning to provide recommendations to reviewer. In order to review the change, the automated change review executor 300 may have a pre-loaded language keyword library and a repository of code patterns, which identifies the coding/technology languages and is used to perform quality and performance checks for proposed change. The automated change review executor 300 provides an end to end automated process (e.g., the objects relating to the change are reviewed and promoted to test systems without any manual intervention).

Referring now to Block 500 of FIG. 5, the method may include receiving a code change indicator. In such an instance, the code change indicator is associated with a changed code that has been changed by at least one user. The code change indicator may be the changed code itself (e.g., the changed code is provided to the system for the change review). Additionally or alternatively, the code change indicator may indicate the code that has been changed (e.g., the code change indicator may not be the changed code itself, but a message or notification with information on the changed code, such as location and changes made). As such, the method may include retrieving the changed code based on the code change indicator (e.g., in an example in which the changed code was not provided with the code change indicator).

The code change indicator may also include information relating to the changed code. For example, the code change indicator may identify the user that updated the code. Additionally, the code change indicator may reference which portions of the code were changed (e.g., whether code was added, removed, and/or revised and the location of said change).

The system may also have a knowledge base containing information relating to one or more previous change reviews. The knowledge base may be built using machine learning by compiling previous change review information. The knowledge base can be utilized to optimize the review process for different change reviews in future reviews. The change review indicator received may be initially analyzed to determine whether the type of changed code is known (e.g., the same or similar change to a previously analyzed change). In an instance in which the object relating to the change is new, the changed code may be analyzed to determine the category and complexity of the given change in addition to the other operations discussed herein.

Referring now to Block 510 of FIG. 5, the method may include determining a coding language of the changed code based on at least one of a keyword library or a code pattern. In various embodiments, the methods shown in FIG. 5 may be performed on code in a plurality of different coding languages. Moreover, the coding language of the changed code may not be known before the operations of Block 510. As discussed below, the coding language of the changed code is determined based on at least one of a keyword library or a code pattern.

The keyword library is configured to be language universal (e.g., any coding language could have a language keyword indicator associated with that given language). The keyword library contains keyword indicators for a plurality of different coding languages. Each language keyword indicator includes one or more keyword terms associated with a given coding language. The language keyword indicator for each coding language may be one or more keyword terms commonly used in said coding language. The keyword terms may be reserved keywords for a given language (e.g., one or more terms may be designated by a coding language as a reserved keyword and therefore is a known value).

The keyword library may be compiled using machine learning. As such, the language keyword indictor for a given coding language may be generated by the system using machine learning upon the input of one or more keyword terms commonly used in the coding language. In some embodiments, the one or more keyword terms commonly used in a given coding language may be based on an analysis of one or more sets of code in the given language. For example, the system may be configured to determine the one or more keyword terms by analyzing one or more sets of code inputted that are known to be a particular language (e.g., the system may receive multiple sets of code in JAVA and determine one or more keyword terms for JAVA based on said multiple sets of code in JAVA). Additionally or alternatively, the keyword terms may be provided to the system otherwise (e.g., the system may receive a list of one or more keyword terms for a given coding language).

In various embodiments, the coding language of the changed code is determined based on a code pattern of the changed code. Different coding languages have different style or formatting. The code pattern of the changed code used to determine the coding language may include the order of terms, the formatting, the types of characters used, and/or the like. For example, two different coding languages may be formatted differently.

The system may learn one or more code patterns for a given coding language using machine learning. For example, the system may determine one or more code patterns of one or more sets of code in a known language (e.g., the system may determine code patterns for JAVA by analyzing one or more sets of JAVA code). Additionally, the system may be updated using machine learning (e.g., upon determining the coding language, either through the operations discussed herein or otherwise, the code may be analyzed to determine if there are any code patterns of the code that is not already known by the system).

The code patterns for one or more coding languages may be stored in a repository. The code patterns may be stored in the same location as the keyword library. Alternatively, the code patterns may be stored separately from the keyword library. The code patterns repository may include code patterns for a plurality of languages. In some instances, the code pattern repository may have code patterns for the same or similar languages as the keyword library has language keyword indicators.

In various embodiments, the determination of the coding language of the changed code may be based on both the keyword library and the code patterns. For example, the keyword library may be used to narrow the potential coding languages and then the code patterns may be used to determine which of the narrowed list is coding language of the changed code. As some coding language are similar, the system may not be capable of determining every coding language using the keyword library or the code pattern alone.

Referring now to Block 520 of FIG. 5, the method may include determining a change review indication based on the determined coding language. Upon determination of the coding language of the changed code, the system may analyze the changed code to determine if there are any errors in the code. The determination may include running the code (e.g., executing the code and analyzing the performance log). In various embodiments, an error may prevent the code from being executed successfully. Additionally or alternatively, the error may cause the code to be executed slowly. Various other coding errors may cause the code to perform in a suboptimal manner. The method may also include determining error information, including the type of error and the location of the error. For example, a given line of code may be causing the code to fail execution and said line of code may be missing a certain character (e.g., missing a period or parenthesis). In some embodiments, the error may be based on performance of the code compared to previous versions of the same code. For example, in an instance in which a portion of code is updated, the change review indication may indicate an error if the run time of the updated code is substantially different than the previous code (e.g., the code running much slower or faster may indicate an unintended result of the change).

In an instance in which no errors are found, the change review indication may indicate that the code is approved and ready for implementation. The changed code may not be implemented (e.g., being allowed to go live within a system) until the change review is complete. For example, in an instance a developer changes a given code, the old code will remain active until the changed code is approved. The changed code may be locked during a change review (e.g., the developer or other developers may not change code during the change review process).

Referring now to optional Block 530 of FIG. 5, the method may include determining one or more remedial measures in an instance in which the change review indication indicates one or more errors exist in the changed code. In some embodiments, the system may be capable of determining one or more remedial measures to the changed code that may fix at least one of the errors in the changed code. For example, in an instance in which the error is caused by a typo, the system may be configured to determine the location of the typo and the recommended correction. In some embodiments, the correction may be incorporated into the code for implementation or further review. Alternatively, the recommended correction may be noted for approval by a reviewer (e.g., the reviewer may receive a report that indicates that there is an error at a certain line of code that includes the recommended correction for approval by the reviewer).

In an instance in which the system does not identify remedial measures (or the system is unable to identify a remedial measure for a specific error), the operations may continue to Block 540, in which the change review actions are carried out, such as determining a reviewer to review the changed code.

Referring now to Block 540 of FIG. 5, the method may include determining one or more change review actions to carry out based on the change review indication.

The change review actions may include selecting a reviewer to analyze the code in response to the change review indication. In such an instance, the reviewer is selected based on an availability of the reviewer, a complexity of the changed code, a reviewer rating, and/or previously completed change reviews. Each reviewer may have one or more coding language specialties. Additionally, the reviewer may have a reviewer rating. The reviewer rating may be associated with a given reviewer's talent level and/or experience. The selection of the reviewer may be based on the complexity of the changed code (e.g., the higher complexity of the changed code, the higher desired rating of the reviewer selected). The reviewer may be selected automatically. In some instances, the automatic selection may be altered manually (e.g., a manager may change the selection for a reviewer that is too busy or has unexpected unavailability).

In some embodiments, the selection of the reviewer may also be based on past change reviews completed by the reviewer. In an instance in which the system analyzes the change review indicator to determine if the same or similar type of change review has previously been completed, the system may also determine if any available reviewers had performed such reviews (e.g., a reviewer that has handled a similar type code change may be able to perform a better review change of the current code change).

A reviewer may be selected to analyze the code in response to the change review indication in an instance in which the change review indication indicates that the code contains one or more errors. Additionally, in some instances, a reviewer may also be selected to analyze the code in response to the change review indication in an instance in which the change review indication indicates that the code contains no errors. In some embodiments, the review of the changed code by the reviewer may be bypassed in an instance in which the change review indication indicates that the changed code contains no errors. In such an instance, the changed code may be approved for implementation without review.

In an instance in which the change review indication indicates that the changed code contains an error, the method may include causing a transmission of the one or more remedial measures (determined in optional Block 530) to the selected reviewer for review. As noted above, the remedial measure may be provided to the reviewer, along with other information relating to the error (e.g., error type and/or location of error).

The method may also include receiving one or more error corrections to the changed code based on the review by the reviewer. Upon review, the reviewer may approve the changed code, update and approve the changed code, or reject the changed code. In an instance in which the reviewer approves the changed code, the reviewer may indicate that the changed code may be implemented.

The method may also include one or more rating requests for both the developer and the reviewer. The reviewer may give a rating of the changed code that is then reflected in the rating of the developer who changed the code. The rating may be based on the complexity of the code, the amount of errors, the difficulty in fixing the errors, the quality of the changed code, and/or the like. Additionally, the reviewer may also be rated based on said reviewer's reviewing. The rating of the reviewer may be completed by a manager or secondary reviewer (e.g., a dedicated reviewer may rate the reviewer's performance based on the complexity). The rating of the reviewer may be based on the knowledge of the reviewer language, the time taken to complete a review, the quality of the review, the quality of the solution to any errors, and/or the like.

Figure 6:
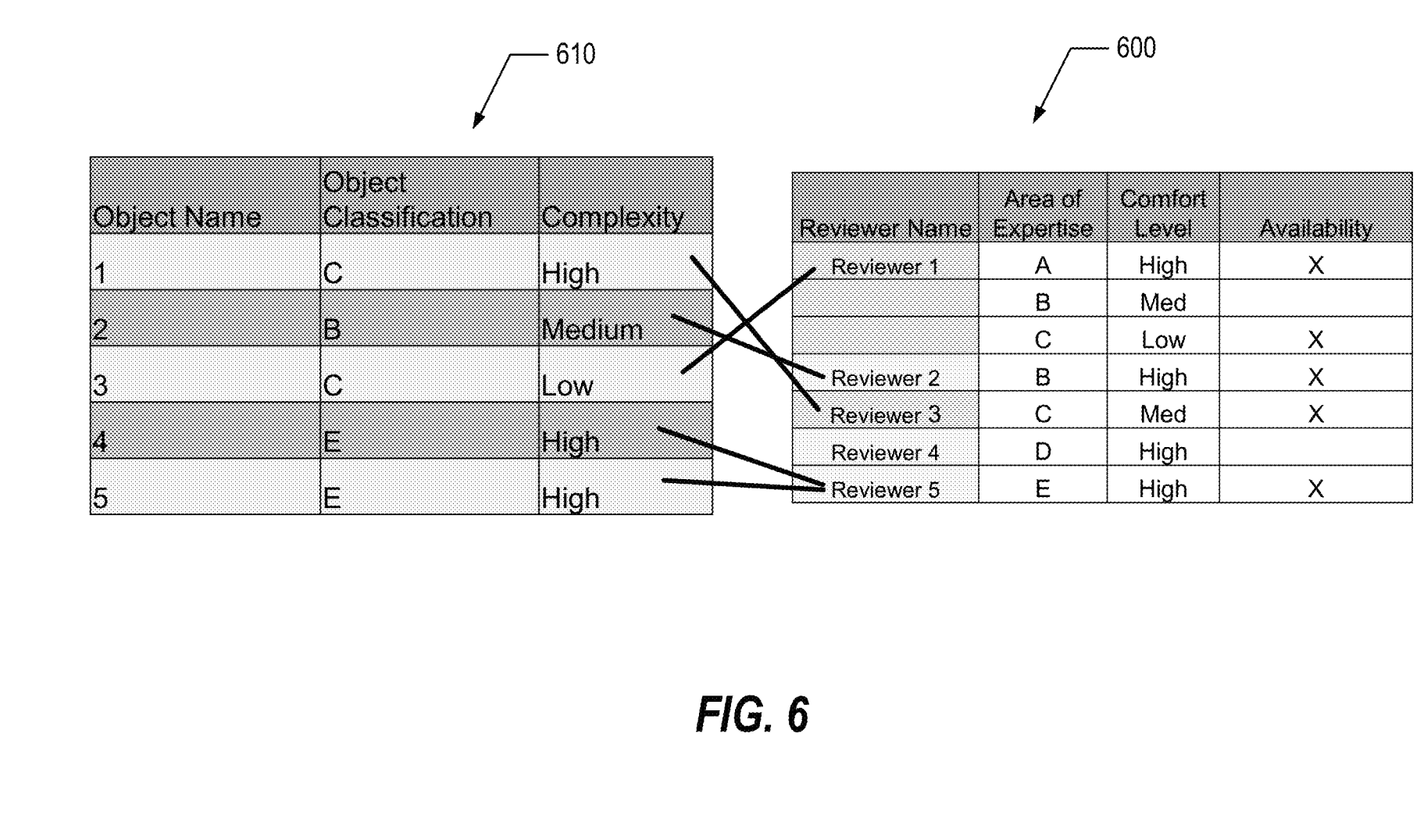
FIG. 6 provides illustrative charts showing the assignment of a code change to a reviewer for review in accordance with various embodiments of the present disclosure.

Referring now to FIG. 6, example charts shown used to illustrate the operations of an example embodiment of present disclosure. Reviewer chart 600 is an example reviewer chart showing potential reviewers for selection (e.g., such as in the operations discussed in Block 540 of FIG. 5). As shown, the information known about the reviewers may include areas of expertise (e.g., languages capable of reviewing), comfort level (e.g., either reviewer self-rated comfort level or a reviewer rating), and/or reviewer's availability. As shown, reviewer Reviewer 1 is experienced in Language A (high comfort level), Language B (medium comfort level), and Language C (low comfort level). However, Reviewer 1 is only currently available for reviewing Language A and Language C code changes (availability may be based on type of code change or reviewer's overall availability, such as when being unavailable when on vacation). Additionally, Reviewer 2 is experienced in Language B at a high comfortable level and is available. Reviewer 3 is available and is experienced in Language C at a medium comfort level. Reviewer 4 is unavailable, but is experienced in Language D at a high comfort level. Reviewer 5 is available and is experienced in Language E at a high comfort level.

Change chart 610 is an example chart showing 5 different code changes (e.g., Objects 1 through 5) that could be assigned to an available reviewer (e.g., a reviewer from reviewer chart 600) for review as discussed herein. As shown, Object 1 is in Language C with a high complexity. As such, Object 1 may be assigned to Reviewer 3, who has the highest comfort level in Language C and is available. Based on Reviewer 3's schedule, Reviewer 3's availability may be updated based on the assignment of Object 1 (e.g., Reviewer 3's availability may change to unavailable or remain available). Object 2 corresponds to a code change in Language B with a medium complexity and therefore may be assigned to Reviewer 2, who has a high comfort level in Language B and is available. Object 3 corresponds to a code change in Language C with a low complexity and may be assigned to Reviewer 1 (low comfort level and available) or Reviewer 3 (medium comfort level and potentially available depending on availability after being assigned Object 1). Since Reviewer 3 was already assigned a harder complexity code change in Language C and/or because the complexity of Object 3 is low, the system may select to assign Object 3 to Reviewer 1. Objects 4 and 5 each corresponds to a code change in Language E with high complexity. As such, at least one of Objects 4 and 5 may be assigned to Reviewer 5, who has a high comfort level in Language E and is available. In some instances, in which Reviewer 5 is available to take multiple code changes, both Objects 4 and 5 may be assigned to Reviewer 5. In an instance in which Reviewer 5 is not available to take two projects, then there would be no reviewers for the second object, as no other reviewer have experience with Language E. In such an instance, a manager may determine the next steps (e.g., wait until Reviewer 5 has finished the first object or finding another reviewer not listed to review the second object). In this example, each of the objects were assigned to an available reviewer. In some embodiments, multiple reviewers may be selected (e.g., in case the first selected reviewer is unexpectedly unavailable).

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing coding change review, the system comprising:
   at least one non-transitory storage device; and at least one processing device coupled to the at least one non-transitory storage device, wherein the at least one processing device is configured to:

receive a code change indicator, wherein the code change indicator is associated with a changed code that has been changed by at least one user and wherein the code change indicator provides the changed code;

lock the changed code to prevent access by the at least one user;

determine a coding language of the changed code based on a keyword library and a code pattern, wherein the keyword library is compiled via machine learning and the code pattern is learned via machine learning, wherein the keyword library and the code pattern are stored in a single repository;

analyze the changed code to determine an unknown code pattern and execute an update utilizing machine learning;

based on the determined coding language, determine a change review indication, wherein the change review indication indicates whether one or more errors exist in the changed code and the code change indicator comprises a notification with a location of the changed code and changes made in the changed code;

based on the change review indication, determine one or more change review actions to carry out;

determine to bypass the coding change review by a reviewer when the change review indication indicates no errors exist in the changed code and determine one or more remedial measures when the change review indication indicates one or more errors exist in the changed code, wherein the remedial measures identify a location of the one or more errors and a correction to code for implementation;

transfer automatically the one or more change review actions to carry out to the reviewer, wherein the reviewer is selected based on a complexity of a code change associated with the one or more change review actions, an availability of the reviewer, a reviewer rating, and reviewer previously completed change reviews;

reassign the one or more change review actions to carry out to a second reviewer based on a second user input, wherein the second user input comprises manual intervention based on an unexpected unavailability of the reviewer; and generate a request for rating for the at least one user and a request for rating for the second reviewer, wherein the request for rating for the at least one user comprises a code complexity, an error total, an error resolution difficulty, and a quality of the changed code and the request for rating for the second reviewer comprises a second reviewer language knowledge, a completed review elapsed time, and an error solution quality and the request for rating for the second reviewer is executed by a second user.

2. The system of claim 1, wherein the keyword library comprises a plurality of language keyword indicators, wherein each language keyword indicator comprises one or more keyword terms associated with a different coding language.

3. The system of claim 1, wherein the at least one processing device is configured to cause a transmission of the one or more remedial measures to at least one reviewer for review.

4. The system of claim 1, wherein the one or more change review actions comprise selecting a reviewer to analyze the changed code in response to the change review indication.

5. The system of claim 1, wherein in an instance in which the change review indication indicates that no errors exist in the changed code, the one or more change review actions comprise approving the changed code for implementation, and wherein in an instance in which the change review indication indicates that one or more errors exist in the changed code, the one or more change review actions comprise determining a reviewer to analyze the changed code.

6. A computer program product for providing coding change review, the computer program product comprising at least one non-transitory computer-readable medium having computer-readable program code portions embodied therein, the computer-readable program code portions comprising:

an executable portion configured to receive a code change indicator, wherein the code change indicator is associated with a changed code that has been changed by at least one user and wherein the code change indicator provides the changed code;

an executable portion configured to lock the changed code to prevent access by the at least one user;

an executable portion configured to determine a coding language of the changed code based on a keyword library and a code pattern, wherein the keyword library is compiled via machine learning and the code pattern is learned via machine learning, wherein the keyword library and the code pattern are stored in a single repository;

an executable portion configured to determine a change review indication based on at least one of a keyword library and a code pattern, wherein the keyword library is compiled via machine learning and the code pattern is learned via machine learning, wherein the keyword library and the code pattern are stored in a single repository;

an executable portion configured to analyze the changed code to determine an unknown code pattern and execute an update utilizing machine learning;

an executable portion configured to determine one or more change review actions to carry out based on the change review indication;

an executable portion configured to determine to bypass the coding change review by a reviewer when the change review indication indicates no errors exist in the changed code and determine one or more remedial measures when the change review indication indicates one or more errors exist in the changed code, wherein the remedial measures identify a location of the one or more errors and a correction to code for implementation;

an executable portion configured to transfer automatically the one or more change review actions to carry out to the reviewer, wherein the reviewer is selected based on a complexity of a code change associated with the one or more change review actions, an availability of the reviewer, a reviewer rating, and reviewer previously completed change reviews;

an executable portion configured to reassign the one or more change review actions to carry out to a second reviewer based on a second user input, wherein the second user input comprises manual intervention based on an unexpected unavailability of the reviewer; and an executable portion configured to generate a request for rating for the at least one user and a request for rating for the second reviewer, wherein the request for rating for the at least one user comprises a code complexity, an error total, an error resolution difficulty, and a quality of the changed code and the request for rating for the second reviewer comprises a second reviewer language knowledge, a completed review elapsed time, and an error solution quality and the request for rating for the second reviewer is executed by a second user.

7. The computer program product of claim 6, wherein the keyword library comprises a plurality of language keyword indicators, wherein each language keyword indicator comprises one or more keyword terms associated with a different coding language.

8. The computer program product of claim 6, wherein the computer-readable program code portions further comprise an executable portion configured to cause a transmission of the one or more remedial measures to at least one reviewer for review.

9. The computer program product of claim 6, wherein the one or more change review actions comprise selecting a reviewer to analyze the changed code in response to the change review indication.

10. The computer program product of claim 6, wherein in an instance in which the change review indication indicates that no errors exist in the changed code, the one or more change review actions comprise approving the changed code for implementation, and
wherein in an instance in which the change review indication indicates that one or more errors exist in the changed code, the one or more change review actions comprise determining a reviewer to analyze the changed code.

11. A computer-implemented method for providing coding change review, the method comprising:
receiving a code change indicator, wherein the code change indicator is associated with a changed code that has been changed by at least one user and wherein the code change indicator provides the changed code;
locking the changed code to prevent access by the at least one user;
determining a coding language of the changed code based on at least one of a keyword library and a code pattern, wherein the keyword library is compiled via machine learning and the code pattern is learned via machine learning, wherein the keyword library and the code pattern are stored in a single repository;
analyzing the changed code to determine an unknown code pattern and execute an update utilizing machine learning;
based on the determined coding language, determining a change review indication, wherein the change review indication indicates whether one or more errors exist in the changed code and the code change indicator comprises a notification with a location of the changed code and changes made in the changed code;
based on the change review indication, determining one or more change review actions to carry out;
determining to bypass the coding change review by a reviewer when the change review indication indicates no errors exist in the changed code and determine one or more remedial measures when the change review indication indicates one or more errors exist in the changed code, wherein the remedial measures identify a location of the one or more errors and a correction to code for implementation;
transferring automatically the one or more change review actions to carry out to the reviewer, wherein the reviewer is selected based on a complexity of a code change associated with the one or more change review actions, an availability of the reviewer, a reviewer rating, and reviewer previously completed change reviews;
reassigning the one or more change review actions to carry out to a second reviewer based on a second user input, wherein the second user input comprises manual intervention based on an unexpected unavailability of the reviewer; and
generating a request for rating for the at least one user and a request for rating for the second reviewer, wherein the request for rating for the at least one user comprises a code complexity, an error total, an error resolution difficulty, and a quality of the changed code and the request for rating for the second reviewer comprises a second reviewer language knowledge, a completed review elapsed time, and an error solution quality and the request for rating for the second reviewer is executed by a second user.

12. The method of claim 11, wherein the keyword library comprises a plurality of language keyword indicators, wherein each language keyword indicator comprises one or more keyword terms associated with a different coding language.

13. The method of claim 11, further comprising causing a transmission of the one or more remedial measures to at least one reviewer for review.

14. The method of claim 11, wherein in an instance in which the change review indication indicates that no errors exist in the changed code, the one or more change review actions comprise approving the changed code for implementation, and
wherein in an instance in which the change review indication indicates that one or more errors exist in the changed code, the one or more change review actions comprise determining a reviewer to analyze the changed code.

* * * * *